United States Patent [19]

Sakamoto

[11] Patent Number: 4,550,949
[45] Date of Patent: Nov. 5, 1985

[54] LUMBAR SUPPORT DEVICE
[75] Inventor: Takao Sakamoto, Akishima, Japan
[73] Assignee: Tachikawa Spring Co., Ltd., Japan
[21] Appl. No.: 537,714
[22] Filed: Sep. 30, 1983
[51] Int. Cl.[4] .............................................. A47C 3/00
[52] U.S. Cl. ..................................... 297/284; 297/460
[58] Field of Search ................................ 297/284, 460
[56] References Cited

U.S. PATENT DOCUMENTS 3,973,797 8/1976 Obermeier et al. ................ 297/284

FOREIGN PATENT DOCUMENTS 2822766 12/1978 Fed. Rep. of Germany ...... 297/284
2856784 7/1979 Fed. Rep. of Germany ...... 297/284
2026314 2/1980 United Kingdom ................ 297/284

Primary Examiner—Francis K. Zugel
Attorney, Agent, or Firm—Cushman, Darby & Cushman

[57] ABSTRACT

A lumbar support device in which a lumbar support member is pivotally secured to a swing frame mounted swingably in a fore-and-aft direction relative to a back frame such that the lumbar support member can be rotated back and forth, the angle of the fore-and-aft inclination of the swing frame relative to the back frame can be variably adjusted by means of a cam mechanism, and the angle of inclination of the lumbar support member relative to the swing frame can be adjusted by means of an inclination adjustment means.

7 Claims, 8 Drawing Figures

LUMBAR SUPPORT DEVICE

BACKGROUND OF THE INVENTION

1. Field of the Invention

The present invention relates to a lumbar support device which is incorporated in a seat back of a vehicle seat to support the lumbar portions of an occupant so as to relieve the occupant's fatigue.

2. Description of the Prior Art

Conventionally, in this type of lumbar support device, there are provided in the lower portion of a seat back frame a pair of right and left arms such that they are pivotal forwardly and rearwardly, and between both arms there is extended a lumbar support member comprising of an S spring or the like. When the arms are pivoted, the lower portion of a cushion pad of the seat back is pushed outwardly by means of the support member and to thus adjust the compressive hardness of the lower portion of the cushion pad. In such a manner the supporting pressure applied to the lumbar portions of the occupant can be adjusted.

In the conventional lumbar support device, the support member which extends between both arms is designed to have a predetermined width in a vertical direction. Therefore, in such an arrangement, as the support member is extended with its both ends being fixed to both of these arms respectively and since the support member is pivoted integrally with the arms the upper edge portion of the support member, (which during the pivoting motion is a free end relative to the center of rotation of the arms) is strongly abutted against the cushion pad to push it out on a line in a transverse direction, which brings about a strange and uncomfortable feeling to the occupant.

Also, in an arrangement where the support member is provided such that it is pivotal relative to both arms, when during assembly of the seat back the lower edge portion of a top layer is mounted onto the seat back frame, the lower portion ot the cushion pad is pushed rearwardly and thus the support member is inclined relative to both arms with its lower portion being pushed rearwardly. In this case as well, the upper edge portion of the support member is strongly abutted against the cushion pad to push it out on a line in a transverse direction and, as the result of this, the occupant suffers an uncomfortable and strange feeling.

SUMMARY OF THE INVENTION

Accordingly, it is a general object of the present invention to provide a lumbar support device which can overcome the above-mentioned drawbacks in the prior art lumbar support device. In this specification there are disclosed two embodiments of the present invention. In accordance with these embodiments, it is possible not only to adjust the amount of pushing-out by a lumbar support member and the angle of inclination of the lumbar support member as desired, but also to change steplessly the supporting pressure and position according to the preference of an occupant.

It is another object of the present invention to provide a lumbar support device which is capable of changing its supporting pressure and position in a simple operation.

The foregoing objects of the invention can be achieved in one aspect by employing a plate-shaped lumbar support member for supporting the lumbar portions of an occupant. The support member is pivotal forwardly and rearwardly by means of a swing frame. The angle of inclination of the lumbar support member is also adjusted by means of an adjustment mechanism, that is, the adjustment mechanism controls the angle of inclination of the lumbar support member relative to the swing frame. Therefore, it is possible for the occupant to control the supporting pressure and position for the occupant's lumbar portions positively and easily by his or her own operation according to his or her preference, which can relieve the occupant's fatigue during extended time periods in the seat.

Since both operation members for adjusting the supporting pressure and position of the lumbar portions are arranged coaxially, the lumbar support device of the invention is greatly improved in operationability and the occupant can perform an adjustment operation with ease even during driving. Also, both of the operation members are installed collectively in one place so as to improve the aesthetic appearance of the seat as well as their positional relationship with other components.

The swing frame is mounted in the lower portion of a back frame such that it is free to swing and is provided with a cam mechanism which serves to pivot the swing frame and thus the lumbar support member forwardly and rearwardly.

The adjustment mechanism for adjusting the angle of inclination of the lumbar support member relative to the swing frame comprises a doglegged arm with a sector gear, the sector gear being rotatable by means of a pinion fixed to an operation shaft to pivot the doglegged arm so as to adjust the angle of inclination of the lumbar support member.

Brake mechanisms are preferably mounted onto both of the operation shafts for the cam and adjustment mechanisms, respectively.

BRIEF DESCRIPTION OF THE DRAWINGS

The above and other objects, features and advantages of the present invention will be more fully apparent to those of ordinary skill in the art to which this invention pertains from the following detailed description, when considered in connection with the accompanying drawings, in which like reference characters designate like or corresponding parts throughout the several view, and wherein.

DETAILED DESCRIPTION OF THE PREFERRED EMBODIMENT OF THE INVENTION

Figure 1:
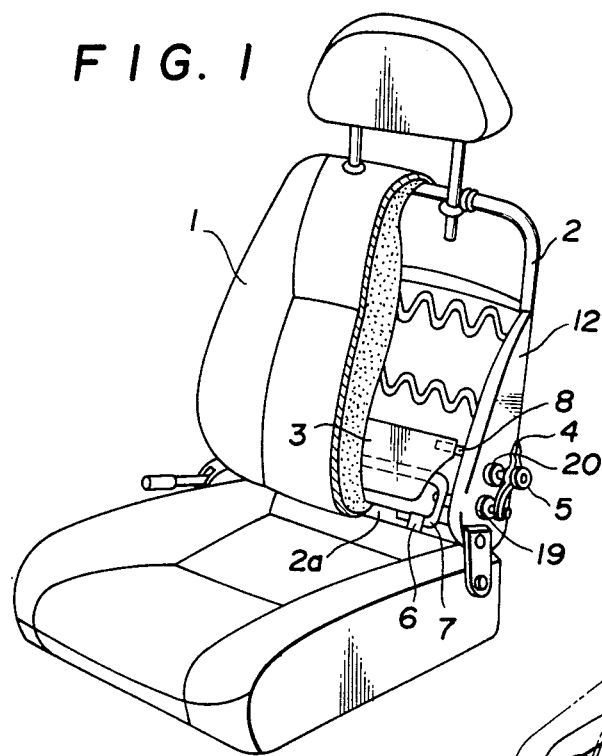
FIG. 1 is a partial sectional perspective view of a vehicle seat incorporating a lumbar support device constructed in accordance with the present invention.
Figure 3:
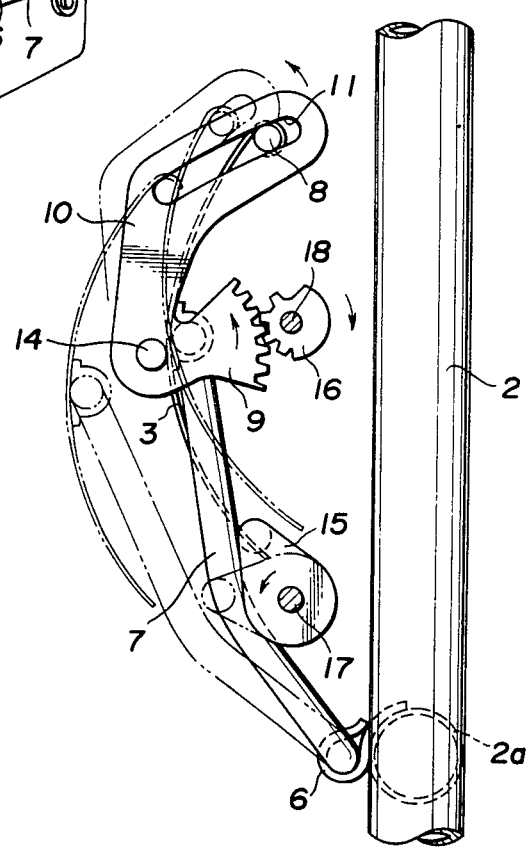
FIG. 3 is a section view taken along a line III—III seen in FIG. 2.
Figure 2:
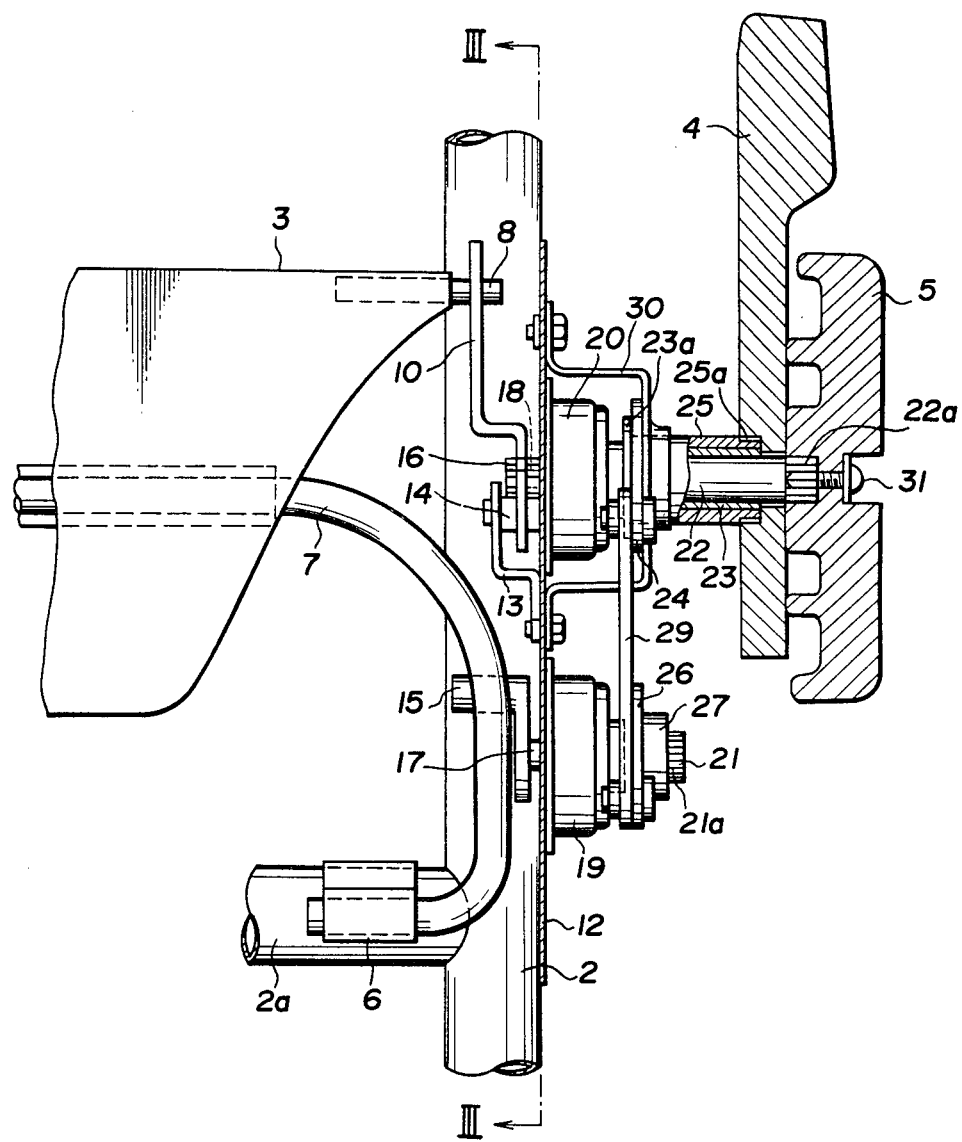
FIG. 2 is a partial sectional front view of the main structural components of a lumbar support device of the invention.

According to the illustrated embodiment of the present invention, as shown in FIG. 1, (1) designates a seat back and (2) represents a back frame included in the interior of the seat back, onto which back frame is mounted a lumbar support member (3). With the support member (3) being maintained constantly parallel to the surface of the seat back (1), the forward and backward position as well as the vertical position of the support member (3) are adjusted by means of rotation of an operation lever (4) and an operation handle (5) in a coaxial manner, so that the lumbar supporting conditions, namely, the pushing-out strength and supporting position can be adjusted as desired according to the preference of the occupant.

FIGS. 2–5 illustrate the main portions of the present invention. The lumbar support member (3) includes an oblong plate body having a projected R-shaped longitudinal section. Lumbar support member (3) is pivotally supported at its rear central portion by a swing frame (7) which is pivotally mounted to the lower side portion (2a) of the back frame (2) by means of bracket (6) so that frame (7) is freely pivotal fore and aft relative thereto. A shaft pin (8) is provided to transversely abut against both side ends of the upper edge of the lumbar support member (3). Shaft pin (8) is also engaged within an elongated slot (11) formed longitudinally at the tip end of a doglegged arm (10), the latter being integrally provided with a sector gear (9). Sector gear (9) is supported between a side bracket (12) of the back frame (2) and a bracket (13) fixed to the interior side thereof by another shaft pin (14) such that it is rotatable back and forth. A cam (15) pivotally mounted onto the side bracket (12) is rollingly abutted against the rear surface of the swing frame (7) and a pinion (16) pivotally mounted onto the side bracket (12) is meshed with the sector gear (9). The cam (15) and pinion (16) have their respective shafts (17) and (18) which are projected outwardly of the side bracket (12). Onto the projected portions of the shafts (17) and (18) are mounted a brake mechanism (19) for back-and-forth adjustment and a brake mechanism (20) for vertical adjustment, respectively.

Both of the brake mechanisms (19) and (20) are provided with operation shafts (21) and (22), respectively, that are integrally connected with the shafts (17) and (18) respectively. The operation shaft (22) for the vertical adjustment brake mechanism (20) is longer as compared to the shaft (21) for the fore-and-aft adjustment brake mechanism (19). In the outer periphery of the tip portion of the longer operation shaft (22) there is formed an axial spline tooth (22a), and in the outer periphery of the shorter operation shaft (21) there is formed an axial spline tooth (21a). Over the operation shaft (22) of the vertical adjustment brake mechanism (20) are engaged a cylindrical spacer (23) having a flange (23a) at its rear end such that the tip portion, that is, the portion where the spline tooth (22a) is formed is projected outwardly of the spacer (23). Also, over the outer periphery of the spacer (23) is rotatably engaged a cylindrical shaft (25) having an arm (24) fixed to its rear end and a spline tooth (25a) axially formed in the outer periphery of its tip end portion. Further, a cylindrical body (27), which has an arm (26) fixed to its rear and a tooth groove (27a) formed in its inner periphery to be meshed with the spline tooth (21a), is placed over the operation shaft (21) of the back-and-forth adjustment brake mechanism (19) by meshing the tooth groove (27a) with the spline tooth (21a) and is engaged by means of a pin (28). The arm (24) on the side of the brake mechanism (20) and the arm (26) on the side of the brake mechanism (19) are rotatably connected with each other by means of a link piece (29).

The cylindrical shaft (25), which is placed over the operation shaft (22) of the vertical adjustment brake mechanism (20) by means of the spacer (23), is rotatably supported by a bracket (30) fixed to the outer surface side of the side bracket (12) of the back frame (2). The back-and-forth adjusting lever (4) is engaged with and fixed to the tip portion of this cylindrical shaft (25), that is, the portion having the spline tooth (22a) formed therein. The portion having the spline tooth (22a) of the operation shaft (22) and projecting from the cylindrical shaft (25) is projected from the back-and-forth adjusting lever (4). The spline tooth (22a) is engaged within an axial bore (5a) formed in the vertical adjustment handle (5) and then is fixed by tightening a screw (31).

Figure 6:
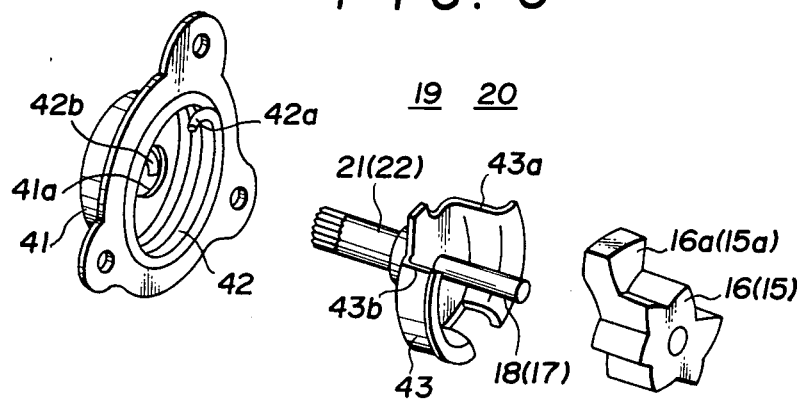
FIG. 6 is an exploded perspective view of a brake mechanism to be incorporated into the lumbar support device of the invention.
Figure 4:
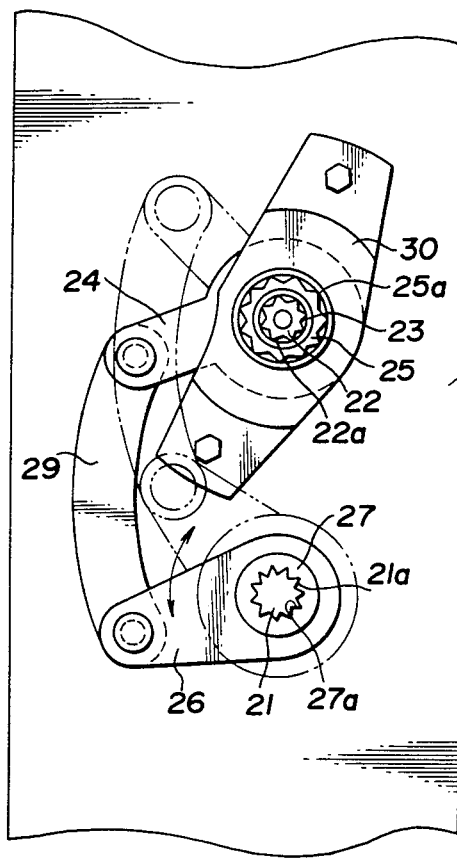
FIG. 4 is a side elevation view of a lumbar support device of the invention, with a lever and handle being omitted therefrom.
Figure 7:
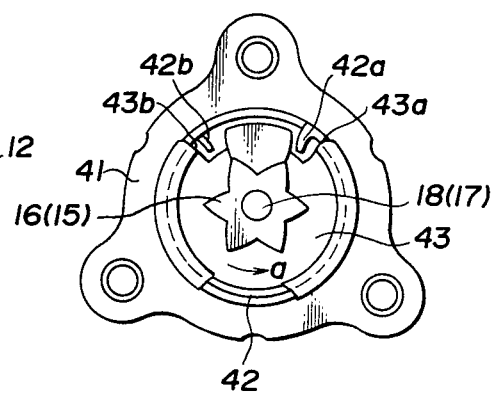
FIG. 7 is a side elevation view of the brake mechanism illustrating the interior of the same; and, FIG. 8 is a partially sectional front view of main portions of another embodiment according to the invention.
Figure 5:
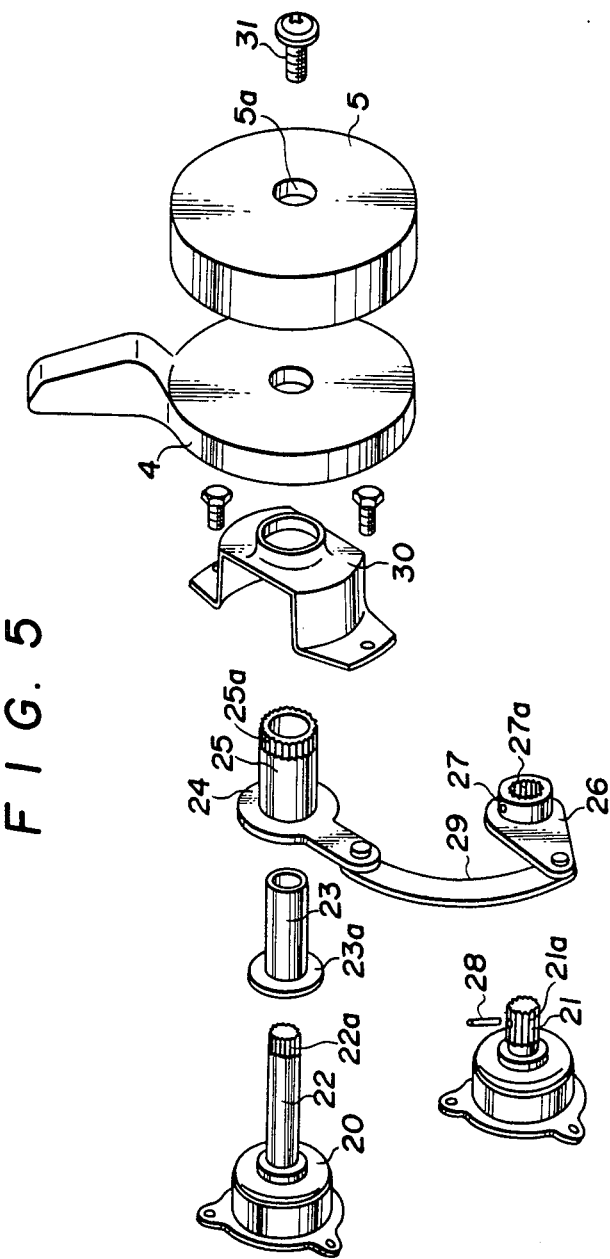
FIG. 5 is an exploded perspective view of operation portions of the lumbar support device.

FIGS. 6 and 7 illustrate an example of the brake mechanisms (19) and (20). In this embodiment, there is provided a circular outer case (41), a coiled torsional spring (42), having securing portions (42a) and (42b) at its both ends, is engaged with and abutted against the inside circumference o the case (41). Internally of the torsion spring (42) there is inserted a circular inner case (43) formed with securing edges (43a) and (43b) on its outside circumference corresponding to the securing portions (42a) and (42b) of the torsional coiled spring (42), and the above-mentioned operation shafts (21)(22) are fixed to the outside central portions of the inner case (43) and projected outwardly of the axial bore (41a) of the outer case (41). The above-mentioned shafts (17) (18) of the cam (15) and pinion (16) are fixed such that they are aligned with the inside central portion of the inner case (43) in this brake mechanism, that is, the axial direction of the operation shafts (21)(22), respectively.

In the cam (15) and pinion (16) connected to this brake mechanism there are provided arms (15a) and (16a) respectively which are respectively disposed between the securing portions (42a) and (42b) of the coiled torsion spring (42) within the inner case (43). With the brake mechanism thus arranged, when the operation shafts (21)(22) are rotated, for example, in a direction of an arrow "a" in FIG. 7, the inner case (43) is also rotated integrally therewith so that the securing edge (43a) is abutted against the securing portion (42a) of the torsional coiled spring (42). In this state, if the operation shafts (21)(22) are rotated further, then the coiled torsion spring (42) is compressed to disengage from the internally circumferential surface of the outer case (41), so that the operation shafts (21)(22) become free to rotate in the direction of arrow "a". As a result, the cam (15) and pinion (16) cooperatively connected with these operation shafts (21)(22) are also rotated respectively. In this way, when the operation shafts (21)(22) are stopped at a desired rotational position, the torsional coiled spring (42) is then released from the pressure applied by the internal case (43) to recover itself, that is, it is abutted against the internally circumferential surface of the outer case again. In this state, if an expected rotational force is applied to the cam (15) and pinion (16), then their respective arms (15a) and (16a) are brought into contact with the securing portion (42a) or (42b) of the coiled torsion spring (42) corresponding to its rotational direction and push against it to expand the coiled torsion spring (42), so that the frictional forces of the coiled spring with the external case (41) is further increased to prevent the cam (15) and pinion (16) from rotating.

The operation of the lumbar support device including the brake mechanism arranged as above will now be described above.

If the fore-and-aft adjustment lever (4) is rotated, then the cylindrical shaft (25) which is meshed with lever (4) also is rotated. Rotation of the cylindrical shaft (25) in turn causes the operation shaft (21) of the fore-and-aft adjustment brake mechanism (19) or the cam shaft (17) to rotate by means of arm (24), link piece (29) and arm (26). With such rotational movement, the cam (15) is eccentrically rotated and pushes against the rear side of the swing frame (7). As the result of this, the swing frame (7) is swung forwardly about the portion where it is pivotally mounted by the bracket (6) so as to forwardly displace the lumbar support member (3). During this operation, the shaft pin (8) is provided in the upper edge portion of the lumbar support member (3) is moved forwardly along the elongated slot (11) in the arm (10) and, therefore, the lumbar support member (3) is displaced forwardly in parallel to slot (11). Thus, when rotation of the lever (4) is stopped at a desired position, as described above, the brake mechanism (19) is activated to lock the cam (15).

If the handle (5) for vertical adjustment is rotated, then the operation shaft (22) of the vertically adjusting brake mechanism (20) which is meshed with the handle (5) is also rotated and thus the shaft (18) integral with the shaft (22) is rotated so that the pinion (16) is caused to revolve. Revolution of the pinion (16) causes the sector gear (9), meshed with the pinion (16), to be rotated about the shaft pin (14) The arm thus responsively is rotated integrally with the sector gear (9) to push against the shaft pin (8) which is engaged within the elongated slot (11) in the arm (10). Thus, the lumbar support member (3) is rotated about the portion where it is pivotally mounted onto the swing frame (7), and thus it is inclined (i.e. vertically displaced) relative to the swing frame (7). In this case, too, when the vertical adjustment handle (5) is stopped to rotate, the brake mechanism (20) is activated to lock the pinion (16) and to secure the arm (10), so that the lumbar support member (3) is maintained in its inclined position.

Although the foregoing rotational operations of the cam (15) and pinion (16) are performed separately by means of the back-and-forth adjustment lever (4) and vertical adjustment handle (5) respectively, it should be noted that since the lever (4) and handle (5) are provided in a coaxial manner, they can be operated simultaneously, and, thus, the pinion and cam can be rotated cooperatively. In this manner, it is possible to set the amont of pushing-out and angle of inclination of the lumbar support member (3) at a desired level.

Also, since the lumbar support member (3) is constructed in a forwardly and projectingly bent R-shape, the portions serving as a lumbar supporter do not cover the full width thereof, but are limited to the top portions of the R-shaped surface thereof. Therefore, when the lumbar support member (3) is rotated relative to the swing frame (7) to change its angle of inclination, the lumbar supporting surface of the lumbar support member (3) relative to the occupant is to be raised or lowered and thus the lumbar support position thereof is vaired in height.

Although not shown in the drawings, on the other end side of the lumbar support member (3) only an arm having the same configuration as that of the arm (10) is pivotally mounted onto a side bracket, and within the elongated slot of this arm is engaged and supported a shaft pin which is provided in the upper edge portion of the other end. The lumbar support member (3) may be composed of a flat plate body, but it is not necessarily limited to a plate body, for example, an S spring may also be used. Also, although in this embodiment the brake mechanism is installed in the operation part of the cam (15), if a polygonal cam is employed as the cam (15), then the mechanism can be omitted. In this case, however, the swing frame (7) is to be swung stepwise.

Further, the fore-and-aft adjustment brake mechanism (19) connected to the cam (15) and the vertical adjustment mechanism (20) connected to the pinion (16) are not limited to those shown in FIGS. 6 and 7, it is possible to use other suitable arrangements which can be maintained locked by stopping of rotation of their respective operations shafts.

Figure 8:
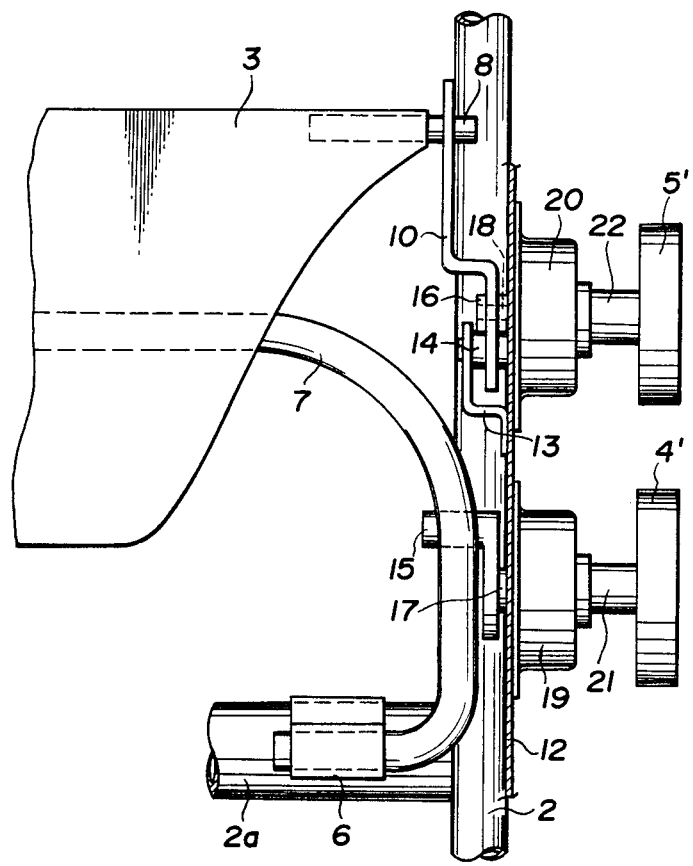

FIG. 8 illustrates another embodiment of the invention. In this embodiment, an operation handle (4') for the back-and-forth adjustment and an operation handle (5') for the vertical adjustment are directly provided in the operation shafts (21)(22) respectively.

Accordingly, in accordance with the present invention, it is possible to adjust the amount of pushing-out and angle of inclination or vertical position of the lumbar support member as desired, and thus the occupant can positively adjust the supporting pressure and position of his or her lumbar portions by his or her own operation according the preference of the occupant. Also, since both operative portions are arranged coaxially in position, the operationability has been greatly improved; for example, the adjustment operation can be performed easily even during driving. Further, as both of the operative portions are arranged collectively in one place, it is possible to obtain a finer aesthetic appearance of the seat as well as to provide a more advantageous relationship with other components.

What is claimed is:
1. A lumbar support device, comprising:
   (a) a plate-shaped lumbar support member provided in the lower portion of a back frame;
   (b) a swing frame pivotally mounting said lumbar support member such that said lumbar support member is free to pivot forwardly and rearwardly relative to said back frame;
   (c) cam means for variably adjusting the angle of inclination of said swing frame relative to said back frame in a fore-and-aft direction; and,
   (d) adjustment means for adjusting the inclination of said lumbar support member relative to said swing frame, wherein
   said cam means includes (i) a cam shaft and a pinion shaft each projecting outwardly of said seat back, (ii) a cam fixed to said camshaft and being abutted against said swing frame, (iii) a pinion gear fixed to said pinion shaft, and (iv) a doglegged arm having one end coupled to said lumbar support member and another end integrally provided with a sector gear which is meshed with said pinion gear.
2. The lumbar support device as in claim 1, wherein said cam means and said adjustment means include respective operation members.

3. The lumbar support device as in claim 1, wherein said lumbar support member includes an oblong plate body.

4. The lumbar support device as in claim 1, wherein said lumbar support member mounts said swing frame on either side of the central portion of the rear surface thereof such that said swing frame is free to pivot, said lumbar support member including a shaft pin on either side of the upper edge portion thereof, and wherein said one end of said doglegged arm defines a slot in which said shaft pin is engaged, whereby when said swing frame is pivoted, the fore-and-aft position of said lumbar support member is varied, and when said doglegged arm is rotated, the vertical position of said lumbar support member is altered.

5. The lumbar support device as in claim 2, wherein each said respective operation member of said cam means and said adjustment means includes a manually-operable knob.

6. The lumbar support device as in claim 2 further comprising mounting means to coaxially mount said respective operation members and to permit independent operation of said cam and pinion shafts.

7. The lumbar support device as in claim 6 wherein said mounting means includes linkage means for transferring pivotal movement applied to said operation member associated with said cam shaft into responsive pivotal movement of said cam.

* * * * *